(12) United States Patent
Blaha et al.

(10) Patent No.: US 11,741,546 B1
(45) Date of Patent: *Aug. 29, 2023

(54) DATA CAPTURE AND INTEGRATION ARCHITECTURE FOR A QUANTAMENTAL COMPUTER SYSTEM

(71) Applicant: Wells Fargo Bank N.A., San Francisco, CA (US)

(72) Inventors: Jennifer Blaha, San Francisco, CA (US); Manjunath Boraiah, San Francisco, CA (US); Joshua T. Demetry, Menomonee Falls, WI (US); Brian J. Jacobsen, Elm Grove, WI (US); Randy Mangelsen, San Francisco, CA (US); Ann M. Miletti, San Francisco, CA (US); Chris Rosato, San Francisco, CA (US); Noah Wise, San Francisco, CA (US)

(73) Assignee: Wells Fargo Bank N.A., San Francisco, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/155,314

(22) Filed: Jan. 22, 2021

(51) Int. Cl.
*G06Q 40/06* (2012.01)
*G06F 9/451* (2018.01)
(Continued)

(52) U.S. Cl.
CPC ............. *G06Q 40/06* (2013.01); *G06F 9/451* (2018.02); *G06Q 40/04* (2013.01); *H04L 41/22* (2013.01)

(58) Field of Classification Search
CPC ........ G06Q 40/06; G06Q 40/04; G06F 9/451; H04L 41/22
See application file for complete search history.

(56) References Cited

U.S. PATENT DOCUMENTS

| 6,345,288 B1 * | 2/2002 | Reed ....................... H04L 67/51 |
| | | 709/200 |
| 7,783,545 B2 | 8/2010 | Sloan et al. |

(Continued)

FOREIGN PATENT DOCUMENTS

| WO | WO-9956192 A2 * | 11/1999 | ............. G06Q 40/00 |
| WO | WO-0235384 A2 * | 5/2002 | ......... G06F 16/9535 |

OTHER PUBLICATIONS

Fifelity Investment: Equity Summary Score, 2015, pp. 1-3 (Year: 2015).*

(Continued)

*Primary Examiner* — Bijendra K Shrestha
(74) *Attorney, Agent, or Firm* — Foley & Lardner LLP

(57) ABSTRACT

A system includes a network interface circuit configured to facilitate data transmission over a network, and a processing circuit comprising one or more processors coupled to non-transitory memory, wherein the processing circuit is configured to receive a first analyst tracking information from a first analyst device configured to access resources related to a security, receive a second analyst tracking information from a second analyst device configured to access resources related to the security, receive a first analyst feedback response from the first analyst device, receive a second analyst feedback response from the second analyst device, and generate an integrated data synopsis based on the first analyst tracking information data set, the second analyst tracking information data set, the first analyst feedback response, and the second analyst feedback response, wherein the integrated data synopsis includes an integrated analyst rating score for the security.

18 Claims, 5 Drawing Sheets

(51) Int. Cl.
*G06Q 40/04* (2012.01)
*H04L 41/22* (2022.01)

(56) References Cited

U.S. PATENT DOCUMENTS

| | | | |
|---|---|---|---|
| 7,860,774 B1 | 12/2010 | Peterson et al. | |
| 8,170,894 B2 | 5/2012 | Yitts | |
| 8,170,942 B2 | 5/2012 | Mead et al. | |
| 8,341,013 B2* | 12/2012 | Lee | G06Q 30/02 |
| | | | 705/7.41 |
| 8,374,937 B2 | 2/2013 | Arnott et al. | |
| RE44,362 E | 7/2013 | Arnott et al. | |
| 8,589,276 B2 | 11/2013 | Arnott et al. | |
| 8,682,767 B2 | 3/2014 | Brazdzionis et al. | |
| 8,694,402 B2 | 4/2014 | Arnott et al. | |
| 10,026,108 B2 | 7/2018 | Jackson et al. | |
| 10,074,079 B2 | 9/2018 | Kapoustin | |
| 2002/0138383 A1 | 9/2002 | Rhee | |
| 2002/0152151 A1 | 10/2002 | Baughman et al. | |
| 2002/0156714 A1* | 10/2002 | Gatto | G06Q 40/02 |
| | | | 705/36 R |
| 2003/0191705 A1* | 10/2003 | Miyata | G06Q 40/04 |
| | | | 705/36 R |
| 2004/0054610 A1 | 3/2004 | Amstutz et al. | |
| 2006/0085247 A1* | 4/2006 | Gatto | G06Q 30/0202 |
| | | | 705/7.31 |
| 2006/0200375 A1* | 9/2006 | Ohnemus | G06Q 10/0639 |
| | | | 705/7.38 |
| 2007/0112662 A1 | 5/2007 | Kumar | |
| 2007/0271197 A1 | 11/2007 | Law | |
| 2009/0006268 A1* | 1/2009 | Tanner | G06Q 40/00 |
| | | | 705/36 R |
| 2010/0145715 A1 | 6/2010 | Cohen | |
| 2011/0054860 A1 | 3/2011 | Guild et al. | |
| 2011/0145164 A1* | 6/2011 | Lavoie | G06Q 30/0282 |
| | | | 705/347 |
| 2014/0164290 A1 | 6/2014 | Salter | |
| 2019/0012252 A1 | 1/2019 | Kapoustin | |

OTHER PUBLICATIONS

Fidelity Investment: Equity Summary Score, 1998-2015, pp. 1-3. (Year: 2015).*
Deloitte: the impact of artificial intelligence on intelligence analysis, May 6, 2020, Reuters, pp. 1-4. (Year: 2020).*
Shea, Sharon: What is Machine-to-Machine (M2M)? Aug. 2019, pp. 1-6. (Year: 2019).*
SEC.gov: Analyzing Analyst Recommendations, Aug. 30, 2010, Investpr Publications, pp. 1-11. (Year: 2010).*
Murphy, Chris B. "The Information Ratio Helps Measure Portfolio Performance." Investopedia, Investopedia, Oct. 27, 2020, www.investopedia.com/terms/i/informationratio.asp.

* cited by examiner

DATA CAPTURE AND INTEGRATION ARCHITECTURE FOR A QUANTAMENTAL COMPUTER SYSTEM

TECHNICAL FIELD

The described aspects and embodiments relate to data capture and analysis systems. More particularly, the described aspects and embodiments relate to a technical data capture architecture for providing integrated investment analytics to, for example, an investment manager.

BACKGROUND

There are many strategies that may be considered when investing in securities (i.e., stocks, bonds, mutual funds, option contracts, exchange-traded funds or other types of investments you can buy or sell). Provider institutions, such as investment banking firms, private equity funds, hedge funds, etc. that invest in securities are often split into investment teams that may manage their own portfolios. Each investment team may include one or more portfolio managers (PMs) and one or more analysts. Generally, analysts perform market research and report findings to the PMs who then make investment decisions for the portfolio.

Each investment team may utilize different strategies when deciding how to manage their portfolios (buy, sell, hold securities, etc.). The PM(s) leading each investment team may also have his or her own personal biases that impact the decisions. Further, each analyst may utilize different theories, strategies, and beliefs when performing market research. Each investment team is generally isolated from other investment teams within the same provider institution. For example, information about the securities, such as ratings, price targets, estimated holding periods, etc., may not be routinely shared between various investment teams within the same provider institution.

SUMMARY

A first example embodiment relates to a system. The system includes a network interface circuit configured to facilitate data transmission over a network, and a processing circuit including one or more processors coupled to non-transitory memory. The processing circuit is configured to: receive first analyst tracking information from a first analyst device relating to a security, wherein the first analyst tracking information includes a first set of analyst interactions; quantify the first set of analyst interactions; receive first analyst feedback from the first analyst device, wherein the first analyst feedback includes a first set of analyst sub-rating scores; receive second analyst tracking information from a second analyst device relating to the security, wherein the second analyst tracking information includes a second set of analyst interactions; receive second analyst feedback from the second analyst device, wherein the second analyst feedback includes a second set of analyst sub-rating scores; quantify the second set of analyst interactions; generate an integrated data synopsis including an integrated analyst rating score for the security, wherein the integrated analyst rating score is based on the quantified first set of analyst interactions, the quantified second set of analyst interactions, the first set of analyst sub-rating scores, the second set of analyst sub-rating scores; and provide a graphical user interface to a manager computing device depicting the integrated data synopsis.

Another example embodiment relates to a system including a provider institution computing system managed by an provider institution. The provider institution computing system includes a provider institution network interface circuit configured to facilitate data transmission over a network and a provider institution processing circuit including one or more processors coupled to non-transitory memory. The provider institution processing circuit is configured to: provide at least one of an analyst application or a virtual machine to a plurality of analyst devices, including a first analyst device and a second analyst device, wherein the at least one of the analyst application or the virtual machine are configured to track analyst interactions with each analyst device; track a plurality of analyst interactions on the plurality of analyst devices, wherein the analyst interactions include at least one of a phone call and an electronic communication related to a security; quantify the analyst interactions based on a characteristic of the analyst interactions including at least one of a duration of the interactions, an identity of the parties involved in the analyst interactions, and a substance of the analyst interactions; receive analyst feedback from the plurality of analyst devices, wherein the analyst feedback includes a plurality of analyst sub-rating scores of the security; generate an integrated data synopsis including an integrated analyst rating score for the security, wherein the integrated analyst rating score is determined based on the quantified analyst interactions, the plurality of analyst sub-rating scores; and provide a graphical user interface to a manager device including the integrated data synopsis.

Another example embodiment relates to a method of generating an integrated data synopsis. The method includes receiving first analyst tracking information from a first analyst device configured to access resources related to a security, wherein the first analyst tracking information includes a first set of analyst interactions; quantifying the first set of analyst interactions based in part on the type of interaction; receiving first analyst feedback from the first analyst device, wherein the first analyst feedback includes a first set of analyst sub-rating scores; receiving second analyst tracking information from a second analyst device configured to access resources related to the security, wherein the second analyst tracking information includes a second set of analyst interactions; receiving second analyst feedback from the second analyst device, wherein the second analyst feedback includes a second set of analyst sub-rating scores; quantifying the second set of analyst interactions based in part on the type of interaction; generating the integrated data synopsis including an integrated analyst rating score for the security, wherein the integrated analyst rating score is determined based on the quantified first set of analyst interactions, the quantified second set of analyst interactions, the first set of analyst sub-rating scores, the second set of analyst sub-rating scores; and, providing a graphical user interface to a manager computing device including the integrated data synopsis.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
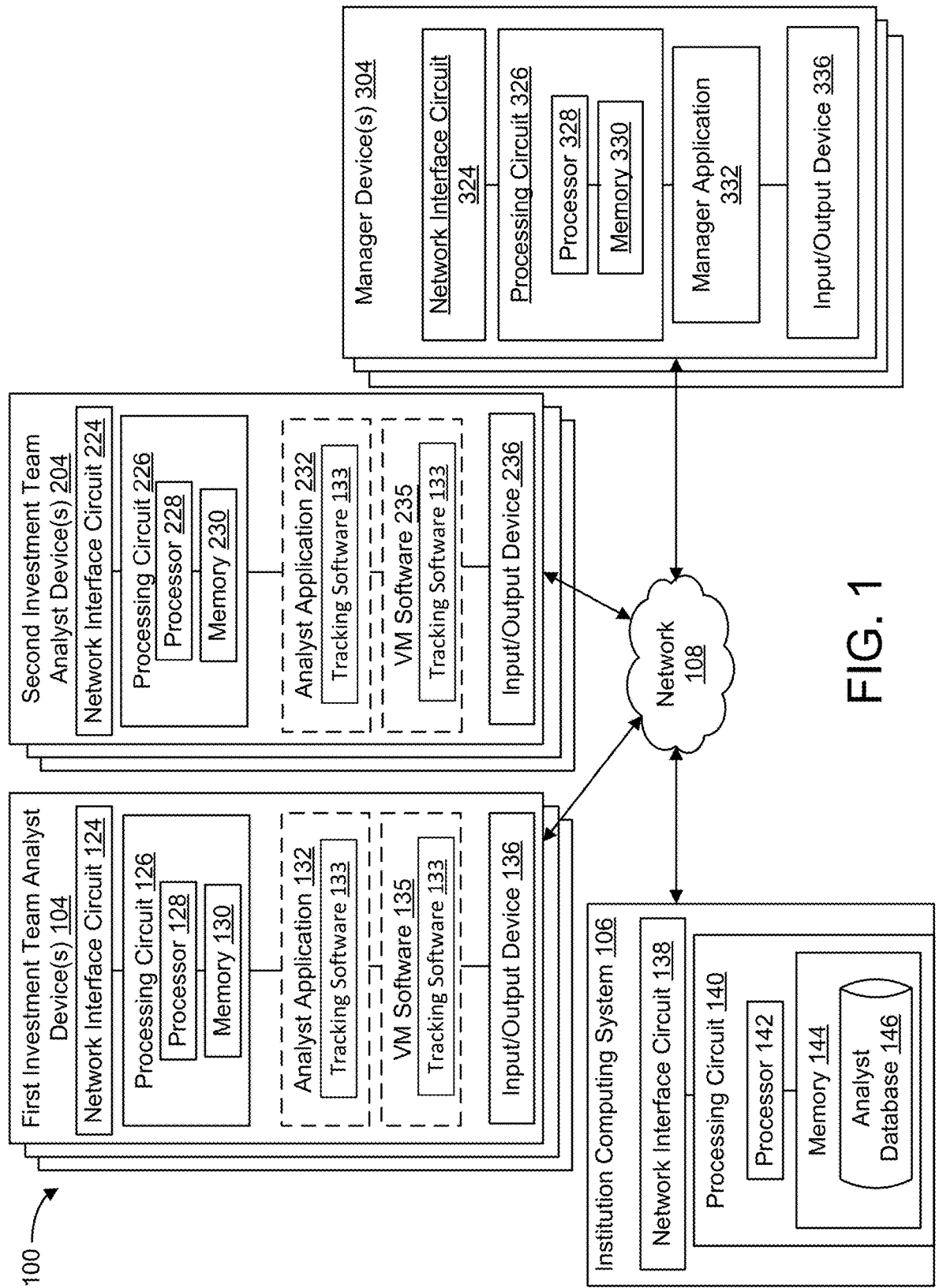
FIG. 1 is a block diagram of a data capture computing system according to an example embodiment.

Referring generally to the Figures, systems and methods for capturing data associated with multiple analyst devices and integrating the captured data are disclosed according to various embodiments described herein. According to various example embodiments, a data capture and integration platform captures investment information from various investment teams, integrates investment information from the various investment teams, and provides the integrated data to the various investment teams. In some embodiments, a data capture and integration system may track each individual analyst's interactions with research resources (e.g., phone calls, web sites, instant messaging, etc.), quantify each analyst's interactions with the research resources, integrate a plurality of quantified analysts' interactions to generated an aggregated report, and provide the aggregated report to an investment manager.

A variety of ways exist to analyze securities (e.g., equity securities, debt securities, derivative securities) and industries. Common approaches include performing a fundamental analysis and a quantitative analysis. The primary goal of a fundamental analysis (FA) is to identify or determine a true or "fair market" value of the security based on a variety of economic and financial factors (i.e., the fundamentals). For example, a fundamental analysis of a company may consider the company's industry position, growth rate, growth potential, income, revenue, and profit margins to try to determine what the fair market value of the company. A fundamental analysis may also consider qualitative or immeasurable characteristics of the security, such as company culture, morale, leadership quality, etc. to determine the fair market value of the security. The fair market value determined through fundamental analysis is then compared to current offering price of the security to determine if the security is of good value. If the security is undervalued (i.e., the fair market value of the price is greater than the current trading price), an analyst using FA may consider the undervalued security a strong buy. Conversely, if the security is overvalued (i.e., the fair market value of the price is less than the current trading price, an analyst using FA may consider the overvalued FA a strong sell. When comparing one security to another, an analyst performing FA may consider the earnings per share (EPS), price to earnings ratio (P/E), projected earnings growth (PEG), free cash flow (FCF), price to book ratio (PB), return on equity (ROE), dividend payout ratio (DPR), price to sale ratio (P/S), dividend yield ration, and debt-to-equity ratio (D/E) of each security to determine which security may be a stronger buy. Typically, fundamental analyses are long-term investment strategies.

In comparison, a quantitative (quant) analysis relies on mathematical and statistical modeling to analyze past, current, and anticipated behavior of the security. Quant analyses include performing a technical analysis to focus on the recent performance of a security to predict future performance of the security. A technical analysis includes examining the patterns within, for example, stock charts to forecast future pricing and volume trends. A technical analysis assumes that future patterns and movements will be similar to previous patterns and movement. A quant analysis may further incorporate statistical and economic variables including valuation ratios, risk measurements, and trading behaviors of a security, though the possibilities of further metrics to consider is nearly endless. For example, an analyst performing a quant analysis may consider a number of benchmark ratios such as the beta (i.e. the systematic risk of the security compared to a similar index), the correlation (i.e., how the security performs compared to another security), and the alpha (i.e., the difference in returns relative to the amount of risk taken).

Fundamental analysis and quantitative analysis are two examples of different types of analysis that may be used by analysts to develop an investment strategy. However, one form of analysis is not necessarily better at predicting the performance of a security than the other type of analysis. Further, multiple analysts performing the same type of analysis (e.g., fundamental analysis) may come to different conclusions about which securities to invest in (i.e., have the highest rating score).

Investment teams within a provider institution are typically managed by a PM that focuses on either fundamental or quantitative analysis. The PM may also instruct the analysts on his or her investment team to focus on either fundamental or quantitative analysis. For example, the PM may have a personal bias that leads the PM to believe one method of investing is better than the other. However, ignoring either fundamental analysis or quantitative analysis may expose the investment team to unnecessary risk. For example, a security may be highly rated using a quantitative analysis (e.g., high earnings, high earnings forecasts, promising chart pattern, etc.) and poorly rated using a fundamental analysis (e.g., poor asset management, poor interest rate on debt owed, poor growth potential, etc.).

According to the present disclosure, a data capture computing system allows an analysis from a first investment team to be integrated with an analysis from a second investment team and provides an integrated data synopsis to a PM such that the PM may implement a hybrid investment strategy. In particular, a quantamental computing system is provided. Automated tracking and data analysis, in combination with subjective analysis provided by analysts, serves to improve upon existing data capture systems. Once the data is collected, the data is quantified (e.g., weighted, etc.) such that the investment research and data from the multiple teams may be integrated and a near real time analysis synopsis may be provided to a PM that includes the integrated data. The various aspects and embodiments described herein provide a technical improvement in present data capture and integration systems where data from multiple investment teams is analyzed. Accordingly, the technical field may include multiple-source data collection and integration, and the described aspects and embodiments of the systems and methods improve upon existing multiple source data collection systems by at least providing a data capture and integration system configured to collect a wide variety of data from multiple sources, integrate the data from multiple sources by creating a uniform data type to integrate data from a variety of sources, and provide an integrated analysis synopsis.

Referring now to FIG. 1, a block diagram of a data capture and integration computing system 100 is shown according to some embodiments. As will be described in further detail below, the data capture and integration system 100 can provide analysts (e.g., analysts, PMs, general managers, etc.) with the ability to track the activity of multiple investment teams, receive input from the investment teams, integrate the tracked activity and the input from investment teams, and provide an integrated synopsis. Technically, the present system couples one or more analyst computing devices to review decision making processes. In certain embodiments, each analyst's activity (e.g., as a part of the decision making process) may be anonymized. The present system tracks the activity of analysts from multiple investment teams and leverages the insight gained from the multiple investment teams to provide an integrated investment synopsis to PMs. Automated tracking and data analysis in combination with subjective analysis provided by each analyst serves to improve upon existing methods and systems for integrating multiple security analyses. The subjective analysis adds an error-checking component to the automatically tracked and captured data to provide a reliable source of data. Once the multiple security analyses are integrated, an integrated analysis synopsis is provided to one or more PMs (or another recipient). Thus, the various aspects and embodiments described herein provide a technical improvement in analyst data collection and integration.

As shown, the data capture and integration system 100 includes one or more first investment team analyst devices 104, one or more second investment team analyst devices 204, one or more manager devices 304, and a provider institution computing system 106. The one or more first investment team analyst devices 104, the one or more second investment team analyst devices 204, the one or more manager devices 304, and the provider institution computing system 106 are shown to be communicatively and operatively coupled to each other via a network 108. The network 108 provides communicable coupling between the one or more first investment team analyst devices 104, the one or more second investment team analyst devices 204, the one or more manager devices 304, the provider institution computing system 106, and/or other components disclosed and described herein to provide and facilitate the exchange of communications (e.g., data, instructions, messages, values, commands, etc.). The network 108 may include one or more of a local area network, a wide area, a wired network, and/or a combination of wireless and wired networks. Examples of network configurations include the Internet, a cellular network, Wi-Fi, Wi-Max, a proprietary banking network, etc. In some embodiments, the network 108 includes a proprietary banking network to provide secure or substantially secure communications.

The first investment team analyst device(s) 104 and the second investment team analyst device(s) 204 are computing devices associated with a first investment team and a second investment team, respectively. For example, each of the first investment team analyst devices 104 may be operated by an analyst(s) on the first investment team and each of the second investment team analyst devices 204 may be operated by an analyst(s) on the second investment team. In certain embodiments, the analyst devices 104, 204 may be configured to access a virtual machine (e.g., via the virtual machine software 135), such that a virtual desktop may be accessed using several different analyst devices 104 (e.g., via the network 108). Thus, the first and second analysts may use the first and second analyst devices 104, 204 to research securities, message other analysts or colleagues, browse the web, and so on.

The first analyst associated with the first investment team analyst device 104 and the first investment team and the second analyst associated with the second investment team analyst device 204 and second investment team may be analysts within the same provider institution. For example the provider institution may be an investment institution such as investment banking firms, private equity funds, hedge funds, etc. In certain embodiments, the first investment team and the second investment team are isolated from one another. That is, except as described otherwise herein, the first and second investment teams are not in direct communication with each other, do not directly share research with one another, and do not work together to develop investment plans. In certain embodiments, the first investment team is focused on/uses a first investing strategy (e.g., fundamental investment strategy) while the second investment team is utilizes a second investment strategy different from the first investment strategy (e.g., quantitative investment). The first analyst utilizes the first investment team analyst device(s) 104 to access investment information that is stored and/or otherwise managed by the provider institution computing system 106. Similarly, the second analyst utilizes the second investment team analyst device(s) 204 to access account information that is stored and/or otherwise managed by the provider institution computing system 106.

The first investment team analyst device(s) 104 and second investment team analyst device(s) 204 can be any type of computing device that may be used to access, research, develop and/or modify information related to various securities. In this regard, the first investment team analyst device(s) 104 and the second investment team analyst device(s) 204 may include any wearable or non-wearable computing device. Wearable computing devices refer to any type of device that an individual wears including, but not limited to, a watch (e.g., a smart watch), glasses (e.g., eye glasses, sunglasses, smart glasses, etc.), bracelet (e.g., a smart bracelet), etc. The first investment team analyst device(s) 104 and the second investment team analyst device(s) 204 may also include any type of computing device including, but not limited to, a phone (e.g., smart phone), a tablet, a laptop, a desktop computer, a personal digital assistant, etc. The first investment team analyst device(s) 104 and the second investment team analyst device(s) 204 may be the same computing devices (e.g., the first investment team analyst device(s) 104 is a tablet and the second investment team analyst device(s) 204 is a tablet). Alternatively, the first investment team analyst device(s) 104 and the second investment team analyst device(s) 204 may be different computing devices (e.g., the first investment team analyst device(s) 104 is a phone and the second investment team analyst device(s) 204 is a laptop).

As shown in FIG. 1, the first investment team analyst device(s) 104 includes a network interface circuit 124 configured to enable the first investment team analyst device(s) 104 to exchange information over the network 108, a processing circuit 126, and an input/output (I/O) device 136. The network interface circuit 124 can include program logic that facilitates connection of the first investment team analyst device(s) 104 to the network 108. The network interface circuit 124 can support communications between the first investment team analyst device(s) 104 and other systems, such as the provider institution computing system 106. For example, the network interface circuit 124 can include a cellular modem, a Bluetooth transceiver, a radio-frequency identification (RFID) transceiver, and a near-field communication (NFC) transmitter. In some embodiments, the network interface circuit 124 includes the hardware and machine-readable media sufficient to support communication over multiple channels of data communication. Further, in some embodiments, the network interface circuit 124 includes cryptography capabilities to establish a secure or relatively secure communication session between the first investment team analyst device(s) 104 and the provider institution computing system 106. In this regard, information (e.g., security ratings, recommended buys, risk assessments, etc.) may be encrypted and transmitted to prevent or substantially prevent a threat of hacking.

The processing circuit 126 is shown to include a processor 128 and a memory 130. The processor 128 may be implemented as one or more application specific integrated circuits (ASICs), field programmable gate arrays (FPGAs), a group of processing components, or other suitable electronic processing components. The memory 130 may be one or more devices (e.g., RAM, ROM, Flash memory, hard disk storage) for storing data and/or computer code for completing and/or facilitating the various processes described herein. The memory 130 may be or include non-transient volatile memory, non-volatile memory, and non-transitory computer storage media. The memory 130 may include database components, object code components, script components, or any other type of information structure for supporting the various activities and information structures described herein. The memory 130 may be communicably coupled to the processor 128 and include computer code or instructions for executing one or more processes described herein.

The analyst device 104 may include an analyst application 132. In the example shown, the analyst application 132 may be provided and supported by the provider institution. In certain embodiments, the analyst application 132 includes activity tracking software 133. The analyst tracking software 133 is configured to track the analyst's activity on the analyst device 104. In certain embodiments, the analyst tracking software 133 includes certain monitoring software (e.g., Teramind™, Veriato Cerebral™, ActivTrack™, Controllio™, Hubstaff™, etc.). Further, the analyst tracking software 133 may include plug-ins. For example, upon installation on the analyst device 104, the analyst application 132 may distribute a plug-in to some or all applications accessible by the analyst device 104 (e.g., web browser, internal messaging application, proprietary banking applications, chart analysis applications, etc.). The plug-in is configured to track the analyst's activity while using the applications on the analyst device 104 that the plug-in is deployed to. Therefore, the analyst application 132 is configured to track activity on the analyst device 104 (e.g., via the analyst tracking software 133), receive feedback from the user of the analyst device 104, provide data associated with the tracked activity and feedback to the provider institution computing system 106, and receive analyst performance feedback from the provider institution computing system 106. The tracking software 133 may further be communicably coupled to the analyst's telephone, such that the tracking software 133 may track the analyst phone calls. The tracking software 133 may further include voice recognition software configured to determine who is speaking and what the person is saying (via natural language processing).

In some embodiments, the analyst application 132 is configured to generate and provide displays for presentation/display by the first investment team analyst device 104 (e.g., to the I/O device 136 described below) that enable the analyst to view and/or manage integrated data received from the provider institution computing system 106 and, in particular, utilize the data capture and integration system 100. For example, the analyst application 132 may include a graphical user interface (GUI) that enables the analyst to interact with the analyst application 132 on the first investment team analyst device as is discussed further below with respect to FIGS. 3 and 4. Accordingly, the analyst application 132 is configured to send information to, and receive information from, the provider institution computing system 106.

As discussed above, the analyst application 132 may be implemented as an application that includes one or more plug-ins (e.g., analyst tracking software configured as a web browser plug-in) on the first investment team analyst device 104. The analyst application 132 may be downloaded by the first investment team analyst device 104 prior to its usage, hard coded into the memory 130 of the first investment team analyst device 104, or be a network-based or web-based interface application such that the first investment team analyst device 104 may provide a web browser to access the application, which may be executed remotely from the first investment team analyst device 104. Accordingly, the first investment team analyst device 104 may include software and/or hardware capable of implementing a network-based or web-based application. For example, in some instances, the analyst application 132 includes software such as HTML, XML, WML, SGML, PHP (Hypertext Preprocessor), CGI, and like languages.

In some embodiments, the analyst interacts with the analyst application 132 via an I/O device 136. The I/O device 136 can include hardware and associated logics that enable the analyst to exchange information with the first investment team analyst device 104. An input component of the I/O device 136 can allow the analyst to provide information to the analyst device 104. The input component may include various hardware and associated logics such as, for example, a mechanical keyboard, a mechanical mouse, a touchscreen, a microphone, a camera, a fingerprint scanner, etc. Likewise, an output component of I/O device 136 can include hardware and associated logics that allow the first investment team analyst device 104 to provide information to the analyst. For example, the output component may include a digital or touchscreen display, a speaker, illuminating icons, LEDs, etc. In this way, the analyst can interact with the analyst application 132. For example, the analyst may provide login information (e.g., analyst name, password, etc.) by typing on a mechanical keyboard or touchscreen keyboard included in the I/O device 136 and be provided account information on a digital display component of the I/O device 136.

Additionally, in certain embodiments and as shown, the analyst device 104 may support and provide access to a virtual desktop via virtual machine (VM) 135, such that the analyst device 104 may be used to access a virtual desktop via the virtual machine 135 (e.g., via the network 108). In this example embodiment, the virtual desktop may be accessed from a plurality of analyst devices 104. The virtual machine 135 includes a tracking software 133 configured to track the analyst activity while on the virtual machine. Similar to the application, the analyst tracking software 133 includes monitoring software (e.g., Teramind™, Veriato Cerebral™, ActivTrack™, Controllio™, Hubstaff™, etc.). Further, the tracking software 133 may include plug-ins. For example, the tracking software 133 may include a plug-in that is added to the software supporting the virtual machine 135 that tracks the activity while using the virtual machine software 135 to access the virtual desktop. Thus, it should be appreciated that the tracking software 133 included in the virtual machine 135 and the tracking software 133 included in the analyst application 132 include similar functionality and are both configured to track the activity of the analyst while the analyst uses the analyst device 104. Therefore, in certain embodiments, the activity on the analyst device 104 may be tracked by either the analyst application 132 or the virtual machine 135.

The second investment team analyst device(s) 204 may be similar to the first investment team analyst device(s) 104. For example, the second investment team analyst device(s) 204 may include a network interface circuit 224 that is similar to the network interface circuit 124. The second investment team analyst device(s) 204 is shown to include a processing circuit 226 that includes a processor 228 and a memory 230. The processing circuit 226 may be the same or similar to the processing circuit 126. Further, the processor 228 and the memory 230 may be similar to the processor 128 and the memory 130, respectively. The second investment team analyst device(s) 204 may include an analyst application 232 that may be similar to the analyst application 132. For example, the analyst application 132, 232 may both include tracking software 133. The second investment team analyst device(s) 204 may also include VM software 235 that is the same or similar to the VM software 135. For example, the VM software 135, 235 may both include tracking software 133. The second investment team analyst device(s) 204 may include an I/O device 236 that is similar to the I/O device 136. Thus, different reference numbers are used with the second investment team analyst device(s) 204 for clarity, but it should be appreciated that the second investment team analyst device(s) 204 may have the same or similar structure as the first investment team analyst device 104. In other embodiments, the structure of the analyst devices 104, 204 may differ.

As shown in FIG. 1, the data capture and integration system 100 also includes one or more manager devices 304. Each manager device 304 is configured to receive information from the first investment team analyst device 104, the second investment team analyst device 204 device, and the provider institution computing system 106. Each manager device 304 may be operated by a portfolio manager or another designated operator. For example, the manager device 304 may be operated by a portfolio manager that manages a group of analysts operating the first investment team analyst devices 104 and/or a second group of analysts operating the second investment team analyst devices 204. In this example, the manager device 304 may receive investment recommendations from the first investment team analyst devices 104 and the second investment team analyst devices 204 via the network 108. Alternatively, the portfolio manager may be completely isolated (e.g., on a different investment team) than the first group of analysts and/or the second group of analysts. In this example, investment recommendations may be provided by the first investment team analyst device 104 and the second investment team analyst device 204 to the provider institution computing system 106 via the network. The provider institution computing system 106 may then provide the information related to the investment recommendations to the manager device 304 via the network 108.

The manager device 304 may be similar or the same as the first investment team analyst device 104 and the second investment team analyst device 204. For example, the manager device 304 includes a network interface circuit 324 configured to enable the manager device 304 to exchange information over the network 108. The manager device 304 is shown to include a processing circuit 326 that includes a processor 328 and a memory 330. The processing circuit 326 may be the same or similar to the processing circuit 126. Further, the processor 328 and the memory 330 may be similar to the processor 128 and the memory 130, respectively. The manager device(s) 204 may include an I/O device 336 that is similar to the I/O device 136. Thus, different reference numbers are used with the manager device(s) 234 for clarity, but it should be appreciated that the manager device 304 may have the same or similar structure as the first investment team analyst device 104. In other embodiments, the structure of the manager device 304 may differ from the analyst devices 104, 204.

The manager device 304 includes a manager application 332. The manager application 332 may be configured to receive investment related information from the first investment team analyst devices 104, the second investment team analyst devices 204, and the provider institution computing system 106. For example, the manager application 332 may receive tracking information from the analyst applications 132, 232 and/or the VM software 135, 235 (e.g., via the tracking software 133). As is described further herein, the tracking information includes any information that may include any tracked data including, but not limited to, the resources interacted with, the amount of time the resources were interacted with, the substance embedded within the resources, the analyst's communications (e.g., emails, phone calls, in person communications, etc.), the length of the analyst's communications, the substance of the analyst's communications, the other parties involved in the analyst's communications, etc. Further, the tracking information from the analyst applications 132, 232 and/or VM software 132, 235 may be provided to the provider institution computing system 106 where the tracking information may be aggregated, summarized, integrated with other information, and/or anonymized and provided to the manager application 332. The manager application 332 may be provided and supported by the provider institution. The manager application 332 is configured to receive data associated with the tracked activity and/or feedback provided via the analyst applications 132, 232 and/or the VM software 132, 235, and receive integrated data from the provider institution computing system 106. In some embodiments, the manager application 332 is configured to generate and provide displays for presentation/display by the manager device 304 (e.g., to the I/O device 136 described above) that enable the manager to view and/or manage integrated data received from the provider institution computing system 106 and, in particular, utilize the data capture and integration system 100. For example, the manager application 332 may include a graphical user interface (GUI) that enables the manager to interact with the manager application 332 on the manager device 304 as is discussed further below with respect to FIG. 5. Accordingly, the manager application 332 is configured to send information to, and receive information from the provider institution computing system 106.

As shown in FIG. 1, the data capture and integration system 100 includes a provider institution computing system 106. As depicted, the provider institution computing system 106 is a backend computer system that supports the analyst device 104, the manager device 304, and other services offered by the provider institution. The provider institution computing system 106 is configured to receive tracking information and feedback from the first investment team analyst devices 104 and the second investment team analyst devices 204, analyze the tracking information and feedback, and provide an integrated analysis synopsis to the manager device 304 based on the tracking information and feedback received. The provider institution computing system 106 is associated with a provider institution. The provider institution may be a financial institution such as an investment banking firm, private equity fund, hedge fund, bank, credit union, credit card company, and so on. The provider institution computing system 106 includes a network interface circuit 138 and a processing circuit 140. The network interface circuit 138 includes program logic that facilitates connection of the provider institution computing system 106 to other components of the data capture and integration system 100 over the network 108.

The processing circuit 140 includes a processor 142 and a memory 144. As shown in FIG. 1, the memory 144 includes an analyst database 146. In other embodiments, the analyst database 146 may be separate from the memory. The analyst database 146 is configured to retrievably store analyst tracking information and feedback from the analyst devices 104, 204. In this regard, the analyst database 146 is configured to store data associated with each analyst device 104, 204. The provider institution computing system 106 may further transform the analyst tracking information and feedback stored in the analyst database 146. For example, the provider institution computing system 106 may receive information from a plurality of analyst devices (e.g., the first investment team analyst device 104 and the second investment team analyst device 204), analyze the data received, and integrate the data into an integrated data synopsis that is provided to the manager device 304. The analyst information stored therein may be generated internally (e.g., at the provider institution computing system 106) or by other entities (e.g., at the first investment team analyst device(s) 104). Alternatively, or additionally, the processing circuit 140 may provide the account information to a analyst device (e.g., the first investment team analyst device(s) 104 and/or the second investment team analyst device(s) 204), such that the analyst device 104, 204 may store the analyst information in a analyst application 132, 232 and each manager device 304 may store the analyst information in the manager application 332 maintained internally within the device.

The network interface circuit 138 includes program logic that facilitates connection of the provider institution computing system 106 to the network 108. The network interface circuit 138 can support communication between the other systems, such as the first investment team analyst devices 104, the second investment team analyst devices 204, and the manager devices 304. For example, the network interface circuit 138 can include a cellular modem, a Bluetooth transceiver, a radio-frequency identification (RFID) transceiver, and a near-field communication (NFC) transmitter. In some embodiments, the network interface circuit 138 includes the hardware and machine-readable media sufficient to support communication over multiple channels of data communication. Further, in some embodiments, the network interface circuit 138 includes cryptography capabilities to establish a secure or relatively secure communication session between other systems such as the first investment team analyst device(s) 104, the second investment team analyst device(s) 204, and the manager device(s) 304. In this regard, information (e.g., account information, login information, financial data, and/or other types of data) may be encrypted and transmitted to prevent or substantially prevent a threat of hacking.

The processor 142 may be implemented as one or more application-specific integrated circuits (ASICs), field-programmable gate arrays (FPGAs), a group of processing components, or other suitable electronic processing components. The memory 144 may be one or more devices (e.g., RAM, ROM, Flash memory, hard disk storage) for storing data and/or computer code for completing and/or facilitating the various processes described herein. The memory 144 may be or include non-transient volatile memory, non-volatile memory, and non-transitory computer storage media. The memory 144 may include database components, object code components, script components, or any other type of information structure for supporting the various activities and information structures described herein. The memory 144 may be communicably coupled to the processor 142 and include computer code or instructions for executing one or more processes described herein. In some embodiments, the provider institution computing system 106 is a distributed computing system and includes one or more servers. In this case, provider institution computing system 106 may include multiple network interface circuits 138 and/or multiple processing circuits 140.

Figure 2:
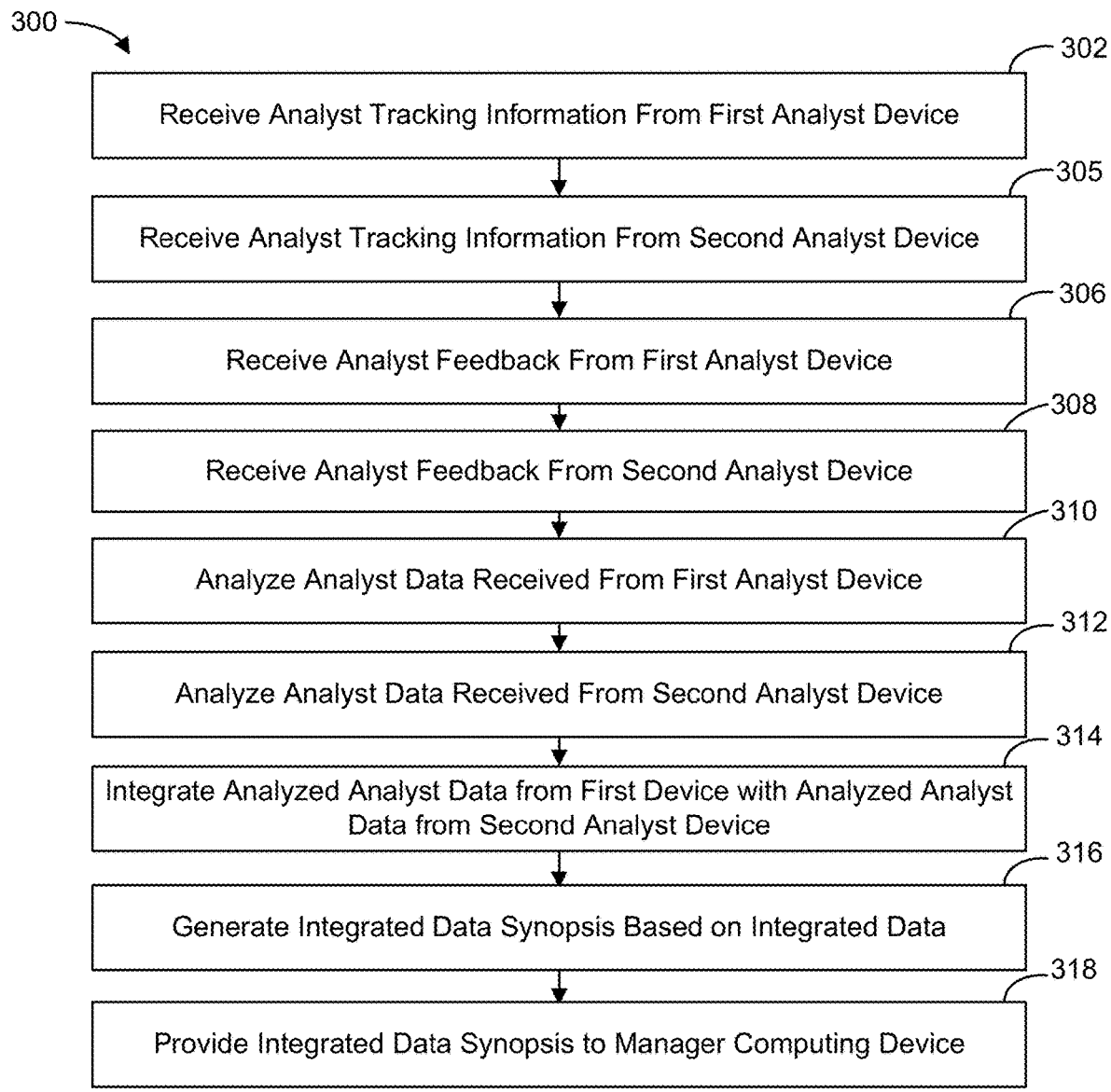
FIG. 2 is a flow diagram of an integrated data process according to an example embodiment.

Referring now to FIG. 2, a flow diagram of an integrated data process 300 is shown according to an example embodiment. It should be appreciated that the processes need not be performed in the order displayed in FIG. 2. Further, certain processes may be omitted and additional processes may be performed in addition to the processes shown in FIG. 2. The integrated data process 300 may be implemented using, for example, the data capture and integration system 100. Accordingly, reference is made to the data capture and integration system 100 to aid explanation of the integrated data process 300.

At process 302, analyst tracking information is received from a first analyst device 104 (e.g., the first investment team analyst device 104). For example, the VM software 135 and/or the analyst application 132 (e.g., via the tracking software 133) of the first analyst device 104 may provide the analyst tracking information to the provider institution computing system 106 via the network 108. The analyst tracking information refers to selectively tracked analyst interactions with research resources (e.g., cookies, web browsing history, emails sent and received, instant messages, Skype messages, Zoom meetings, documents created or opened, etc.). As utilized herein, a resource refers to any type of material that may be interacted with by an analyst to gain insight about a security (e.g., an online article, blog post, financial chart, phone calls, instant messages, etc.). The tracking software 133 may track the amount of time the analyst device 104 interacted with a specified resource. For example, the tracking software 133 may start a timer when a resource is accessed and stop the timer when the resource is no longer accessed. Alternatively, or additionally, the timer may be started in response to a trigger event, as discussed further herein. The analyst tracking information may further include specific details from the analyst's tracking activity. For example, the analyst tracking information may include specific security attributes (e.g., target price, short term outlook, risk rating, etc.) of a specified security that the analyst was researching on the first analyst device 104. These specific security attributes may be pulled from charts, articles, or other sources of information that the analyst engages with on the first analyst device 104, as will be discussed further with respect to FIGS. 3 and 4. For example, the tracking software 133 may implement textual recognition software and natural language processing software to recognize key words and phrases (e.g., current price, PE ratio, profit margin, debt/equity ratio, etc.) located within the sources of information that are engaged with on the first analyst device 104. This information may then be captured by the tracking software 133. The tracking software 133 may also track the amount of time the first analyst device 104 was used to access a specified resource. For example, the first analyst device 104 may have been used to access The Wall Street Journal for a first amount of time and Yahoo! Finance for a second amount of time. In certain embodiments, the tracking software 133 may implement machine learning, natural language processing, and/or artificial intelligence to recognize key words and phrases. Further, the analyst tracking information may include tracking the analyst's interactions with others via communications (e.g., emails, phone calls, in person communications, etc.). For example, the first analyst device may be communicably coupled to the analyst's telephone such that the analyst's interactions (e.g., phone call records) and the specific attributes of those interactions (e.g., the participants on the phone calls and the substance of the phone calls) is recorded and included in the analyst tracking information. Further, the first analyst device may include a sound recording device (e.g., a microphone) that tracks the analyst's verbal discussions and records the substance of these discussions, which may also be analyzed using machine learning, natural language processing, and/or artificial intelligence.

In certain embodiments, the analyst tracking information is tracked by the analyst device 104 in response to a tracking trigger event. The trigger event indicates that the analyst is performing research related to a security. For example, if the analyst is engaged in a phone call, the trigger event may be the analyst mentioning a specific security. This trigger event may be detected by the analyst device 104 (e.g., via a microphone coupled to the analyst application where the user has provided a permission for the microphone to record the user's phone calls for this purpose—i.e., a specific opt-in), which then may track the analyst's conversation. In another example, if the analyst uses the analyst device 104 to send an email, the trigger event may be the email mentioning a specific security (e.g., via textual recognition from the tracking software 133). If the email does not mention a specific security, the email activity may not be tracked by the analyst device 104 (i.e., no detected trigger event). In this sense, the analyst's activity may not be tracked when the analyst is not engaged in activities relevant to a specific security (i.e., irrelevant tracking information is filtered out), thereby reducing the bandwidth and computing demand of the analyst tracking and evaluation computing system 100 (particularly the analyst device that tracks the analyst's research behaviors).

Process 302 may include receiving analyst tracking information from a plurality of analyst devices 104. For example, each member of the fundamental analysis team may have his or her own analyst device 104. Therefore, in this example, process 302 may include receiving analyst tracking information from each of the analyst devices 104.

At process 305, analyst tracking information may be received from a second analyst device 204. Process 305 may be the same or similar to process 302. However, in certain embodiments, the analyst operating the second analyst device 204 is a member of a second investing team. For example, the second analyst device 204 may be associated with a quantitative investment team that uses quantitative analysts to determine investment strategies. Further, process 305 may include receiving analyst tracking information from a plurality of analyst devices 204. For example, each member of the quantitative analysis team may have his or her own analyst device 204. Therefore, in this example, process 305 may include receiving analyst tracking information from each of the analyst devices 204.

At process 306, analyst feedback is received from the first analyst device 104. For example, analyst feedback may be received by the provider institution computing system 106 from the analyst application 132 and/or VM software 135 of the first analyst device 104. The analyst feedback refers to feedback related to the tracked analyst activity from process 302. For example, the analyst feedback may include analyst opinions of the security including an analyst rating score. The analyst rating score is an overall relative score assigned to a specific security based on how the analyst believes the security will perform in the future. For example, if the analyst believes a security will perform well in the future, the analyst may assign the security a positive analyst security rating score (e.g., 8 out of 10 on a scale from 1-10 wherein 10 is the highest possible rating for a security). The analyst feedback may further include analyst sub-rating scores. The sub-rating scores are relative scores assigned to a specific security that rate various aspects of the security. For example, an analyst may submit (e.g., via the first investment team analyst device 104) multiple sub-rating scores, such as a risk rating, valuation rating, the "fair market value" of the security, etc.), as will be discussed further below with respect to FIGS. 3 and 4.

Further, the analyst feedback may be used to quantify qualitative information that is tracked by the first analyst device 104. In this regard, the tracked information is largely qualitative (e.g., which resources were accessed, how long they were accessed, the analyst's communications, and so on). Without more, this tracked information may be difficult to use. Accordingly, at process 306, the analyst may provide quantitative values or ratings to the tracked qualitative information. For example, the analyst may enter sub-rating scores that defines a CEO rating, a board rating, a growth rating, etc. based on the information presented to the analyst. This information may be determined by the provider institution computing system from the tracked information. In this way, the sub-rating scores may be used to normalize (e.g., make uniform) analyst tracking information such that analyst tracking information from multiple resources and communications can combined to produce aggregate sub-rating scores based on feedback received from multiple analyst devices 104, 204. For example, by numerically scoring the tracked qualitative information, this information can be integrated in a seamless way with other numerical data.

In certain embodiments, process 306 may include receiving analyst feedback from a plurality of analyst devices 104. The plurality of analyst devices 104 may each be associated with an analyst on an investment team. For example, each member of the fundamental analysis team may operate his or her own analyst device 104. Therefore, in this example, process 306 may include receiving analyst feedback from each of the plurality of analyst devices 104. It should be appreciated that in certain embodiments, process 306 may be omitted. That is, in certain embodiments, the analyst may not submit feedback on the first analyst device 104.

At process 308, analyst feedback may be received from the second analyst device 204. Process 308 may be the same or similar to process 306. As described above, the analyst operating the second analyst device 204 is a member of a second investing team. For example, the second analyst device 204 may be associated with a quantitative investment team that uses quantitative analysts to determine investment strategies. Further, process 308 may include receiving analyst tracking information from a plurality of analyst devices 204. For example, each member of the quantitative analysis team may have his or her own analyst device 204. Therefore, in this example, process 308 may include receiving analyst tracking information from each of the plurality of analyst devices 204. It should be appreciated that in certain embodiments, process 308 may be omitted. That is, in certain embodiments, the analyst may not submit feedback on the second analyst device 204.

At process 310, analyst feedback and tracked analyst information, collectively referred to as analyst data, received from first analyst device 104 is analyzed. For example, the provider institution computing system 106 may analyze the analyst data (i.e., the tracking information and the analyst feedback) received from the first analyst device 104 at process 302 and process 306. In particular, the analyst data is analyzed and transformed such that the data may be integrated with other information received by the provider institution computing system, as is described further below with respect to process 314.

In some examples, a scoring and weighting system may be implemented by the provider institution computing system 106 to quantify each interaction an analyst has with a security/resource to produce an analyst tracking information score. The analyst tracking information score is a relative score assigned to the analyst's interaction with a resource and is determined based on the characteristic(s) of the interaction (e.g., type of resource, source providing the resource, time spent with the resource, substance of the resource, time spent during a communication, substance of the communication, persons involved with the communication, etc.). For example, some or all of the analyst's interactions that were captured and received at process 302 (e.g., as a part of the analyst tracking information) may be quantified. In certain embodiments, the first analyst device 104 in operated by an analyst that is a member of a fundamental investment team that focuses on fundamental analysis to develop investment strategies. In this example, the analyst may use the first analyst device 104 to access online resources to research the fundamentals of a specific security. This information may then be tracked by the tracking software 133. Certain information that was pulled from the resources accessed on the first analyst device 104 may not be quantified, such as a sub-rating score for the board of directors, a sub-rating score for the CEO's performance, etc. In this example, the provider institution computing system 106 may use natural language processing, machine learning, and/or artificial intelligence software to analyze the qualitative information found in the resources accessed on the first analyst device 104. For example, if the first analyst device 104 is used to access an online article about a specific security, the provider institution computing system 106 may produce quantified data points based on words and phrases found in the article. For example, if an article mentions that the security has "medium growth potential," a quantitative "growth rating" score (i.e., an analyst sub-rating score that describes the growth potential of a security) may be generated (e.g., a 5 out of 10, wherein 10 is the best growth potential). In certain embodiments, the interactions may be categorized as either positive interactions (e.g., an interaction that indicates an analyst believes the security will perform well) or negative interactions (e.g., an interaction that indicates an analyst believes the security will perform poorly). For example, a security may be mentioned on a phone call in a positive manner (e.g., as determined by natural language processing software on the first user device 104) and mentioned in a negative manner in an email (e.g., as determined by natural language processing software on the first user device 104). In this example embodiment, the negative interaction, or a scalar thereof, may be subtracted from the positive interaction, or a scalar thereof. Each interaction may be scaled or weighted depending on the type of interaction. The type of interaction may be defined as the way in which the security is researched, such as a phone call, internet research, software tools, management meetings, articles read, etc. For example, if a security is mentioned on a phone call, this interaction may be weighted by a first amount and if a security is researched online, this interaction may be weighted a second amount. The value assigned to each interaction may be further weighed based on the characteristics of the interaction, such as the participants on a phone call, time spent on a website, and any other trackable characteristics. Therefore, by quantifying the tracked interactions, the provider institution computing system 106 may combine each interaction into a single value representative of numerous tracked interactions.

A sample interaction scoring and weighting algorithm is provided below. In this sample algorithm, $R_{Tracking}$ is an analyst tracking information score for a specific security, $I_{Positive}$ is an interaction point score given to a positive interaction, $I_{Negative}$ is an interaction point score given to a negative interaction. Both $I_{Positive}$ and $I_{Positive}$ may be determined by quantifying the analyst's interactions (e.g., as captured in the analyst tracking information). Both $I_{Positive}$ and $I_{Negative}$ scores may be generated based on the amount of time spent interacting, the people or resource interacted with, and the substance of the interaction. For example, if an analyst spends 3 hours reading a Wall Street Journal Article that discusses the high potential of a security, this interaction may be quantified to produce a positive interaction point score. Further, $C_1$ is a weight factor given to the positive interaction, which may a pre-determined value based on the type of interaction and the characteristics of that interactions, and $C_2$ is a weight factor given to the negative interaction, which may be a pre-determined value based on the type of interaction and the characteristics of that interactions. It should be appreciated that, while the algorithm below only includes two interactions, in certain embodiments, the algorithm may only include a single interaction or may include more than two interactions.

$$R_{Tracking} = C_1 I_{Positive} - C_2 I_{Negative}$$

Process 310 may further include using a scoring and weighting system to produce a feedback rating score. For example, the analyst application 132 and/or VM software 135 may solicit analyst feedback (i.e., the analyst feedback received by the provider institution computing system 106 at process 306) to analyze the qualitative information. For example, a GUI may be presented on the first analyst device 104. As is discussed further below with respect to FIGS. 3 and 4, the analyst application 132 may solicit feedback (e.g., an analyst rating score and analyst sub-rating scores) from the analyst operating the first analyst device 104. This feedback, which is provided to the provider institution computing system 106, may further be used, in combination with the analyst tracking information score to analyze a specific security. For example, if the analyst provides a positive analyst sub-rating score for the CEO (e.g., an 8 out of 10, wherein 10 is the best possible CEO rating), the provider institution computing system 106 may utilize this analyst feedback as a part of generating a feedback rating score. The GUI may also present a number of other sub-rating score fields and prompt the analyst to fill in each of the sub-rating score fields. In certain embodiments, each individual sub-rating score provided by the analyst via the GUI may be weighted to develop an analyst feedback rating score. The weighting system may vary based on the characteristics of the security. For example, the weights applied to each rating may depend on the industry that the security is related to. For example, a growth potential sub-rating score for a security involved in the technology industry may be weighted more heavily than a profitability sub-rating score for that security.

A sample feedback scoring and weighting algorithm is provided below. In this sample algorithm, $R_{Feedback}$ is an feedback rating for a specific security, $S_1$ is a first sub-rating score (e.g., growth rating) score assigned to the security by the analyst, $S_2$ is a second sub-rating score (e.g., profitability rating) score assigned to the security by the analyst, $C_1$ is a weight given to the first sub-rating, which may be a predetermined value based on the type of security and the characteristics of that security, and $C_2$ is a weight given to the second sub-rating, which may be a pre-determined value based on the type of security and the characteristics of that security. It should be appreciated that, while the algorithm below only includes two sub-rating scores, in certain embodiments, the algorithm may only include a single sub-rating score or may include more than two sub-rating scores. Further, the algorithm may include the overall analyst score rating, which may be weighted. Thus, the feedback rating score may be based on an analyst rating score (i.e., a rating score the evaluates the security as a whole) and one or more analyst sub-rating scores (i.e., a sub-rating score that evaluates a specific attribute of the security, such as growth potential, risk, profitability, etc.) submitted by the analyst.

$$R_{Feedback}=C_1S_1+C_2S_2$$

In certain embodiments, process 310 includes analyzing and combining the data received from multiple first analyst devices 104. For example, each analyst of a first investment team may individually operate a first analyst device 104. In this example embodiment, tracking information and analyst feedback from some or all of the first analyst devices 104 may be received at process 302 and 306 respectively. In this example, process 310 may involve aggregating the feedback from the first investment team. For example, if multiple analysts on the first analyst team submit feedback on the same security (e.g., multiple analysts submit a CEO sub-rating score for a publically traded company) the provider institution computing system 106 may average, or take weighted averages, of each analyst's rating score and/or each analyst's sub-rating scores to produce an aggregate rating score or sub-rating score for that security. The aggregate sub-ratings may then be analyzed to create a feedback score that represents the first investment team's feedback as a whole. The aggregate feedback and interaction ratings may be integrated with aggregate feedback ratings from a second investment team to generate an integrated analyst rating score and integrated analyst sub-rating scores, as will be described further below with reference to process 314.

At process 312, data received from second analyst device 204 is analyzed. For example, the provider institution computing system 106 may analyze the analyst data (i.e., the tracking information and the analyst feedback) received from second analyst device 204 at process 305 and process 308. The analyst data is analyzed and transformed such that the data may be integrated with other information received by the provider institution computing system 106, as is described further below with respect to process 314. Process 310 may be the same or similar to process 312 as described above. However, the data analyzed at process 310 may come from the second investment team analyst devices 204. In this example, the second investment team, such as a quantitative investment team, is different from the first investment team.

At process 314, the data that is analyzed at process 310 is integrated with the data that is analyzed at process 312. For example, the analyzed analyst data (e.g., the analyst tracking information score and the feedback rating score) received from the first analyst device 104 may be integrated with the analyzed analyst data received from second analyst device 204. For example, process 314 may involve integrating interaction scores and feedback scores from multiple analyst devices 104, 204 and/or multiple investment teams. For example, the provider institution computing system 106 may generate an integrated analyst rating score and integrated analyst sub-rating scores based on the analyst tracking information scores and the feedback rating scores determined during processes 310 and 312. The integrated analyst rating score is an overall rating or score (value, etc.) that is assigned to a specific security regarding predictive performance of the specific security (e.g., higher values may indicate higher expected performance for a given time period whereas lower values indicate lower expected performance for the given time period). Similarly, the integrated analyst sub-rating scores are relative scores assigned to a specific security that rate various aspects of the security (e.g., growth potential, profitability, etc.).

The integrated analyst rating score may be an average of the individual analyst rating scores from each analyst device (e.g., the first investment team analyst devices 104 and the second investment team analyst devices 204). Further, the integrated analyst rating may be a weighted score based on the individual analyst rating scores, the individual analyst sub-rating scores, the analyst tracking information score, the analyst feedback rating score, and/or characteristics of the security. For example, if the security is a small market cap security in the biomedical field, an analyst rating score from a member of the quantitative analysis investment team may be more heavily weighted than an analyst rating score from a member of the fundamental analysis team because quantitative analysis may be a more accurate predictor of small market cap securities in the biomedical field. Further, machine learning and artificial intelligence may be implemented by the provider institution computing system 106 to adjust the weighting of analyst ratings from various investment teams based on the past performance of the individual analysts or the investment team that the analyst is a part of. In the example where aggregate data sets are created based on data received from multiple first investment team analyst devices 104 and multiple second investment team analyst devices 204, the aggregated data from the first investment team be integrated with the aggregated data from the second investment team.

A sample data integration algorithm is provided below. In this sample algorithm, $R_{Integrated}$ is an integrated rating (e.g., a quantamental rating) for a specific security, $R_{Tracking1}$ is an analyst tracking information score from a first analyst (e.g., as determined during process 306), $R_{Feedback1}$ is a feedback rating score from the first analyst (e.g., as determined during process 306), $R_{Tracking2}$ is an analyst tracking information score from a second analyst (e.g., as determined during process 308), $R_{Feedback2}$ is a feedback rating score from the second analyst (e.g., as determined during process 308). Further, $C_1$ $C_2$, $C_3$, and $C_4$ are all weighting factors given to the ratings. In certain embodiments, the weighting factors may be pre-determined values based on characteristics of the security, the analyst, the investment team each analyst is on, etc. It should be appreciated that, while the algorithm below only includes interaction ratings and feedback ratings from two analyst devices 104, 204, in certain embodiments, the algorithm may include interaction ratings and feedback ratings from more than two analyst devices.

$$R_{Integrated}=C_1R_{Tracking1}+C_2R_{Tracking2}+C_3R_{Feedback1}+C_4R_{Feedback2}$$

In this example, an integrated analyst rating that considers both qualitative and quantitative factors is provided. This is accomplished by assigning numerical values to qualitative data, such that qualitative information can be combined with quantitative information. Further, by assigning numerical values to the qualitative data, a uniform data type is created (e.g., numerical), which enables several types of data to be integrated. Technically, this integration enables the combination of data that was not previously recognized/combinable.

Further, in some embodiments, process 314 may include comparing the analyzed data received from a plurality of analyst devices 104, 204. For example, after the data received is quantified and data points are generated, the provider institution computing system 106 may check for discrepancies in the interaction ratings and the feedback ratings, the analyst rating scores and/or any analyst sub-rating scores, from each analyst device 104, 204. If there is a significant discrepancy in the rating scores or sub-rating scores, the provider institution computing system may send an alert to the analyst devices 104, 204 and/or the manager devices 304. For example, if the provider institution computing system 106 generates a high "growth sub-rating score" data point for a security based on the data received from the first analyst device 104 and a low "growth sub-rating score" for the same security based on the data received from the second analyst device 204, an alert may be generated by the provider institution computing system 106. In certain embodiments, when a first analyst submits a positive rating or sub-rating score (e.g., a 6-10 on a scale from 1 to 10, wherein 10 is the most positive) and a second analyst submits a neutral or negative rating of sub-rating score (e.g., a 1-5 on a scale from 1 to 10, wherein 1 is the most negative and 5 is neutral), a significant discrepancy between the rating or sub-rating scores may be detected. The alert may then be provided to the analyst devices 104, 204 and/or the manager devices 304 to alert the analysts and managers of the discrepancy. In this regard, a "significant discrepancy" may be based determined based on opposite ratings (e.g., high growth rating versus low growth rating), numerical scores differing by more than a predefined amount, and/or some combination thereof.

At process 316, an integrated data synopsis is generated based on the data that was integrated at process 314. The integrated data synopsis is provided in the form of a graphical user interface (GUI). The GUI provides the portfolio manager (or, other recipient) with the integrated analyst rating scores and analyst sub-rating scores of various securities. The integrated data synopsis may include various metrics used to assess the security in addition to the integrated analyst rating score, multiple integrated analyst sub-rating scores (e.g., an integrated risk sub-rating score, an integrated profitability sub-rating score, etc.), the individual analyst tracking information scores, the individual analyst feedback rating scores, the individual rating scores, the individual sub-rating scores, and other integrated ratings. In certain embodiments, the portfolio manager may interact with the integrated data synopsis by selecting a security or a metric used to assess that security to reveal more information about that security or metric.

At process 318, the integrated data synopsis is provided to the manager device 304. For example, the provider institution computing system 106 may provide the integrated data synopsis to the manager device 304. The integrated data synopsis is provided to the manager device 304 so that the manager (e.g., a portfolio manager) operating the manager device 304. The integrated data synopsis may then be displayed as a GUI on the manager device 304 as is discussed in further detail below with respect to FIG. 5.

Figure 3:
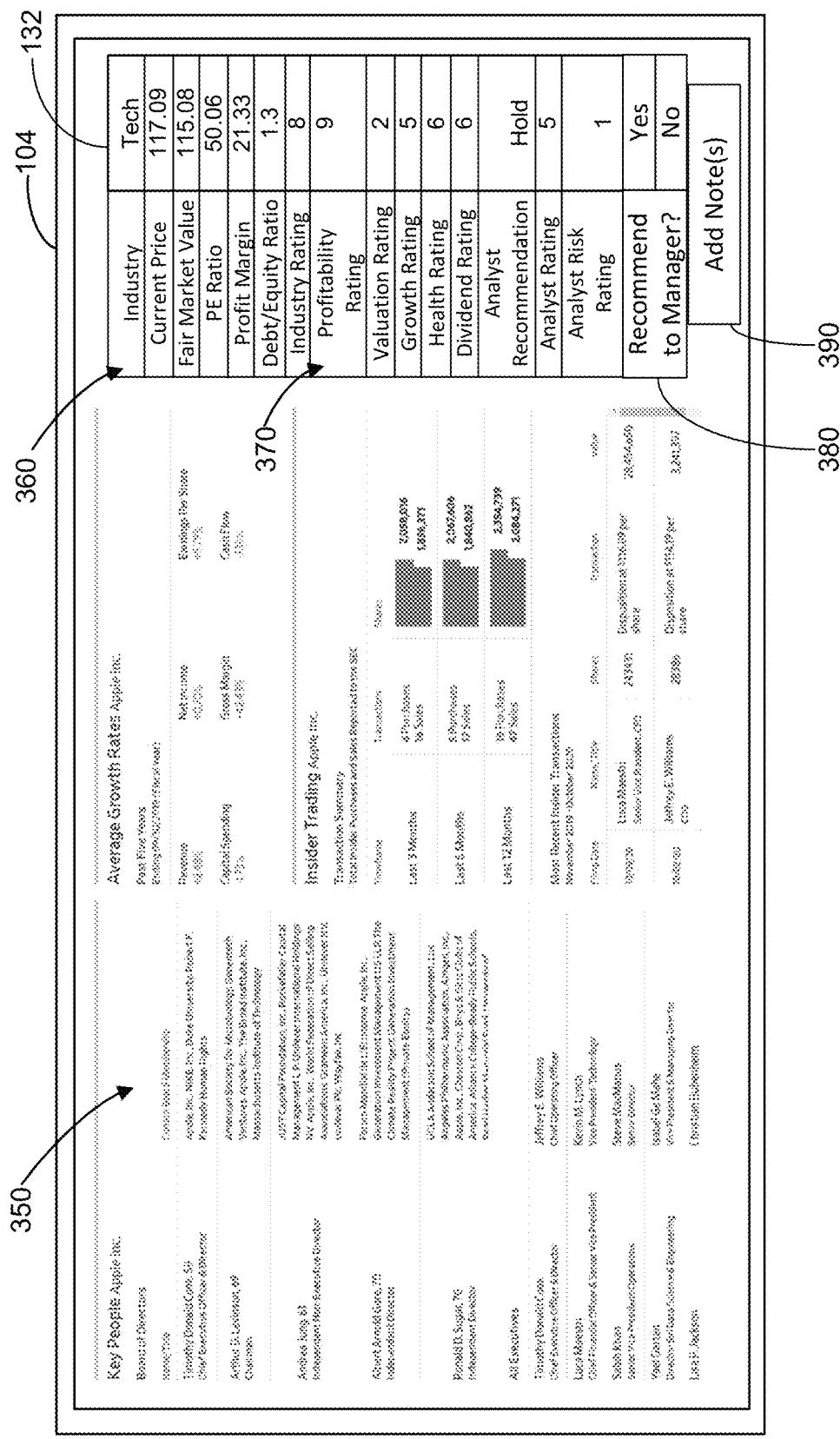
FIG. 3 is a display screen of an analyst device according to an example embodiment.

Referring now to FIG. 3, a display screen of the first analyst device 104 (e.g., the first investment team analyst device 104) is shown according to an example embodiment. As shown, the display screen includes a graphical user interface (GUI) generated by the analyst application 132. It should be appreciated that the first and second analyst devices may utilize the same or a similar GUI as a part of the analyst application 232. The analyst application 132 generates a GUI 350 (or interactive feature) provided on the same display screen 35 as the accessed research resource, which in this example, is shown as an online article regarding a security. It should be appreciated that the research resource may include, but is not limited to, charts, articles, PDFs, emails, word processing documents, etc. Further, it should be appreciated that only a portion of the investment research resource is shown in FIG. 3. For example, the analyst may scroll up or down on the first analyst device 104 to view more information embedded within the investment research resource.

As alluded to above, analyst application 132 generates a GUI 350 that is displayed on the display screen of the first analyst device 104. In other embodiments, the GUI 350 may be provided separate from the research resource. Beneficially, in the example shown, the analyst application 132 utilizes an API or SDK to integrate with a web-browser on the device 104 to enable the GUI 350 to be generated and provided alongside online web browsing research. Further, in some embodiments, the analyst application 132 may operate in the background such that the analyst application 132 is not visible on the display screen of the first analyst device 104 when the web browsing is performed. The analyst application 132 is configured to track the activity on the first analyst device 104. The analyst application 132 may be configured to receive analyst feedback via the GUI 350.

As shown, the GUI 350 of the analyst application 132 includes a plurality of security information fields. For example, as shown, the analyst application 132 includes an "industry" field, a "current price" field, a "fair market value" field, a "PE ratio" field, a "profit margin" field, and a "debt/equity ratio" field. It should be appreciated that these fields are meant to be illustrative and should not be interpreted as limiting. The GUI may include other types of security information fields that may be used to analyze a security. Further, the GUI may not include any security information fields 360. The information that is collected via the GUI 350 fields may be provided to the provider institution computing system 106 as part of processes 302, 305, 306, 308, and 310 described above.

In certain embodiments, the security information fields 360 are automatically populated by the tracking software 133. For example, the tracking software 133 may pull information from the investment resource that is being viewed on the first analyst device 104. For example, if the analyst is viewing a Wall Street Journal article on the first analyst device 104, the tracking software 133 may pull certain information from Yahoo! Finance and automatically populate the security information fields 360. The security information fields 360 may then be displayed on the first analyst device 104 while the analyst is viewing the Wall Street Journal article on the security.

As shown, the GUI 350 of the analyst application 132 also includes a plurality of security sub-rating score fields 370. For example, as shown, the analyst application 132 includes an "industry sub-rating score" field, a "profitability sub-rating score" field, a "valuation sub-rating score" field, a "growth sub-rating score" field, a "health sub-rating score" field, a "dividend sub-rating score" field, an "analyst recommendation" field, an "analyst sub-rating score" field, and an "analyst risk sub-rating score" field. It should be appreciated that these fields are meant to be illustrative and should not be interpreted as limiting. For example, the GUI 350 may include other types of security sub-rating score fields that is used to analyze a security. Further, in other embodiments, the GUI may not include any security sub-rating score fields 370.

In certain embodiments, some or all of the analyst rating scores and analyst sub-rating scores may be entered into the GUI 350 of the analyst application 132 by the analyst that operates the first analyst device 104. For example, the analyst may enter an analyst sub-rating score based on the information available in the investment resource and other information available to the analyst. Further, the analyst may base the analyst sub-rating scores on the analyst's personal knowledge. In some embodiments, the analyst application 132, 232 or VM software 135 may determine some or all of the analyst sub-rating scores.

As shown, the GUI 350 of the analyst application 132 also includes a recommendation field 380. For example, as shown, the analyst application 132 includes a "yes" field and a "no" field that the analyst may select on the GUI of the analyst application 132. The recommendation field may be utilized by the analyst to indicate whether or not the analyst believes the security should be invested in (or, additionally, buy, sell, or hold). For example, if the analyst is a member of the fundamental analysis investment team and believes the security described in the investment resource has a fair market value higher than the current price, the analyst may select the "yes" field on the GUI of the analyst application. In certain embodiments, this response is provided to the provider institution computing system 106 as a part of process 306 described above. Further, upon selecting a field, a notification may be provided to the manager device 304 to alert the manager that the analyst recommends the security.

As shown, the GUI 350 of the analyst application 132 also includes an "add note" field 390. The "add note" field may be selected by the analyst on the GUI of the analyst application 132 to enable the analyst to include further notes on the security. The analyst may attach any type of note, such written text and attachable files (e.g., PDF, word processing documents, etc.). It should be appreciated that in certain embodiments, the GUI 350 may not include an "add note" field. In certain embodiments, these notes are provided to the provider institution computing system 106 as a part of process 306 described above. Further, these notes may be provided to the manager device 304. In certain embodiments, this response is provided to the provider institution computing system 106 as a part of process 306 described above.

It should be appreciated that in certain embodiments, the data provided from the first analyst device 104 to the provider institution computing system 106 at processes 302 and 306 may be tied to a specific analyst device (e.g., the first analyst device 104) and/or a specific investment team (e.g., the fundamental investment team). In this example, when the integrated data synopsis is provided to the manager device 304 at process 318, the manager may be able to view the data and which analyst device (e.g., the first investment team analyst device 104) the data was received from. However, in other embodiments, some or all of the data provided from the first analyst device 104 to the provider institution computing system at process 302 and process 306 may be anonymized. In other words, the data is not tied to a specific analyst device or a specific investment team. In this example, the manager device 304 may receive an integrated data synopsis that does not identify which analysts were involved in developing the integrated analyst rating score and/or which analysts recommended security.

Figure 4:
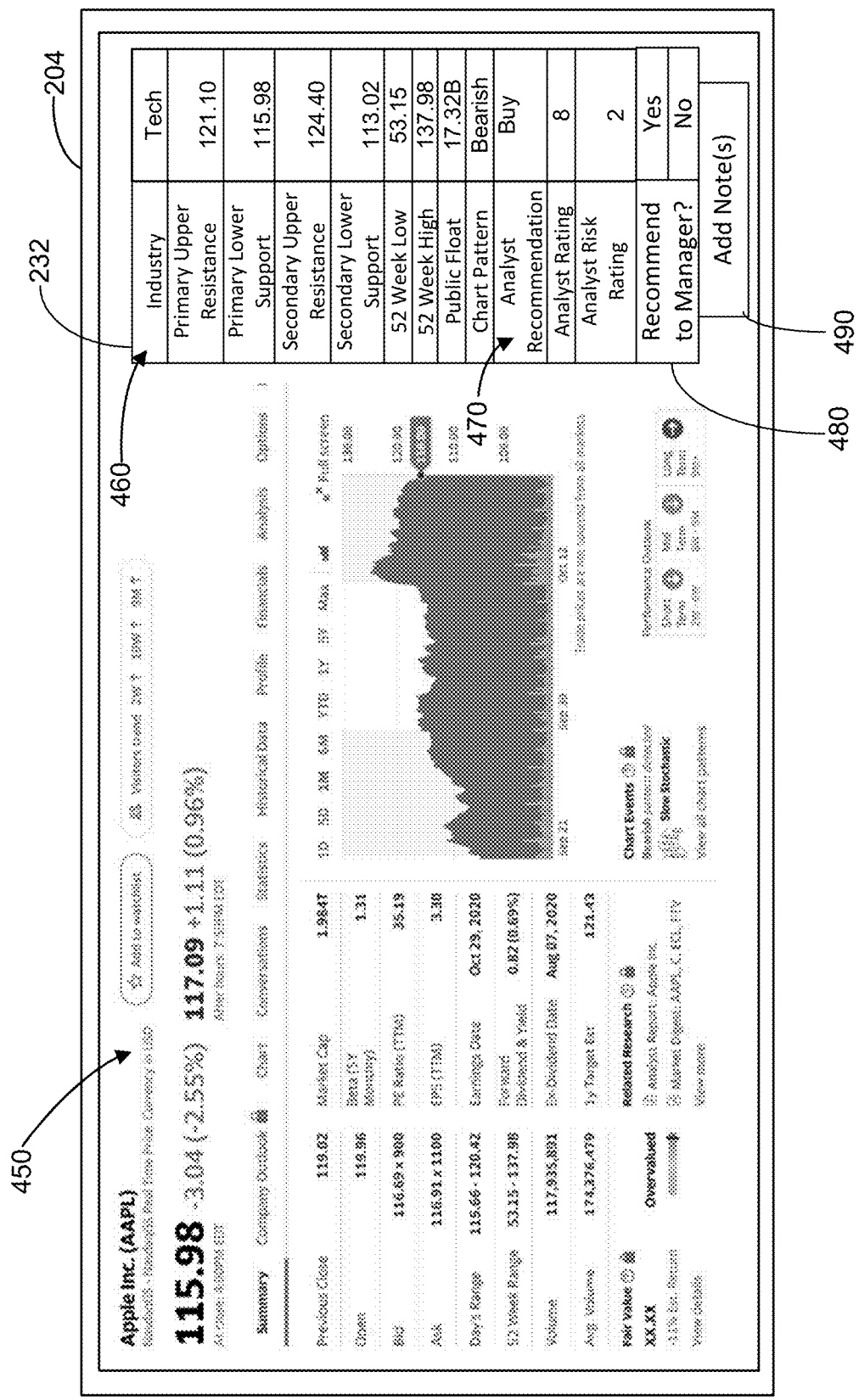
FIG. 4 is a display screen of another analyst device according to an example embodiment.

Referring now to FIG. 4, a display screen of the second analyst device 204 is shown according to an example embodiment. As shown, the display screen includes a graphical user interface (GUI) 450 as a part of the analyst application 232. The second analyst device 204, the analyst application 232, and the corresponding GUI may be utilized as a part of process 300 described above. It should be appreciate that the GUI 450 of the analyst application 232 may be the same or similar as the GUI 350 of the analyst application 132 described above. For example, in certain embodiments, the GUI 450 may include security information fields 460 and security sub-rating score fields 470 that are different, or partially different, from the security information fields 360 and the security sub-rating score fields 370, respectively. However, in other embodiments, the security information fields 360, 460 and the security sub-rating score fields 370, 470 may be identical to produce a more uniform data set across multiple teams. Further, the GUI 450 may include a recommendation field 480 that is the same or similar to recommendation field 380 and the note field 490 may be the same or similar to the note field 380.

Figure 5:
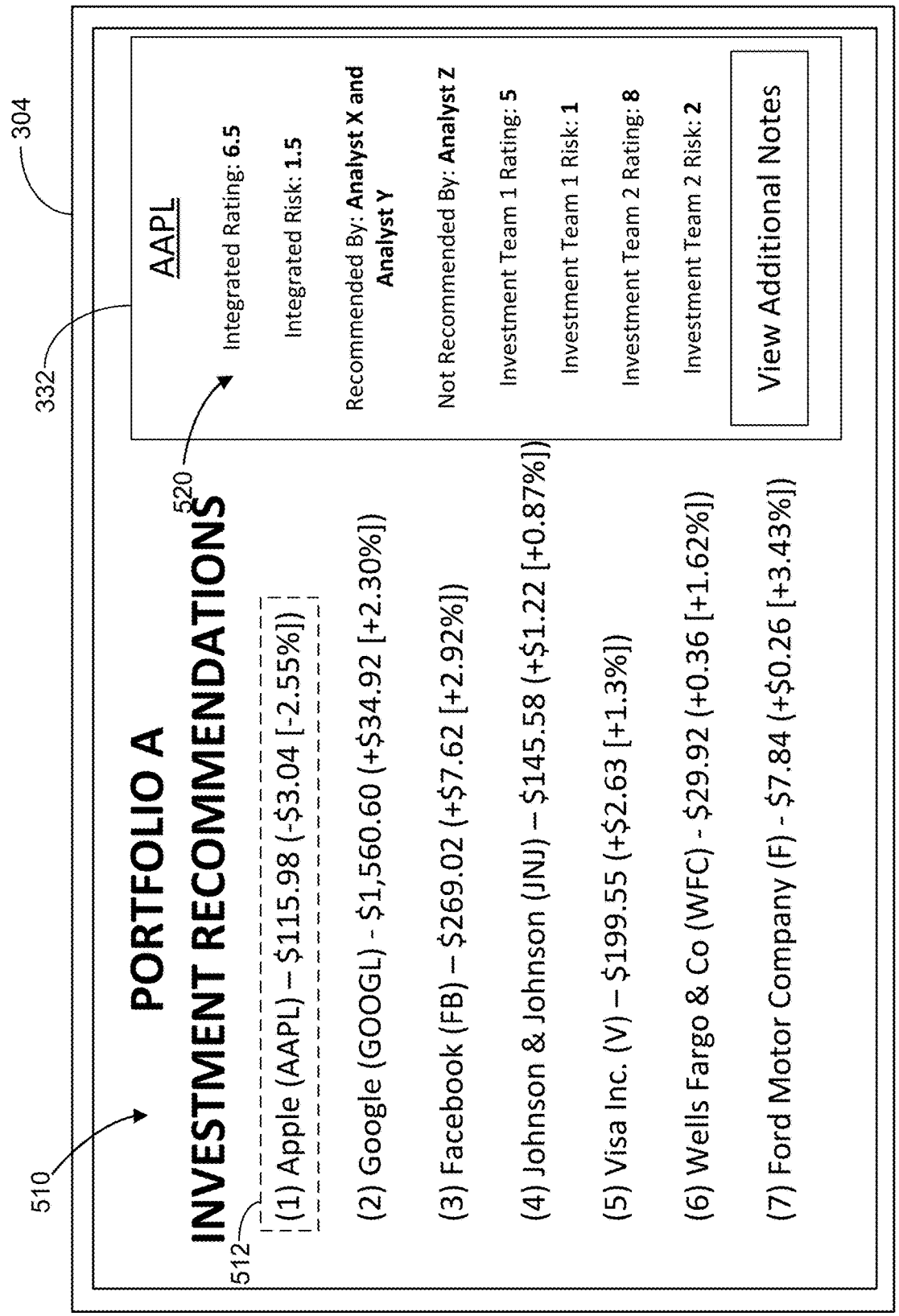
FIG. 5 is a display screen of a manager device according to an example embodiment.

Referring now to FIG. 5, a display screen of the manager device 304 is shown according to an example embodiment. As shown, the display screen includes a graphical user interface (GUI) 510 generated by the manager application 332. The manager device 304, the manager application 332, and the corresponding GUI may be utilized as a part of process 300 described above.

As shown, the display screen of the manager device 304 may be configured to display a list of investment recommendations. For example, the list of investment recommendations may be provided to the manager device 304 from the provider institution computing system 106. The provider institution computing system 106 may provide the list of investment recommendations to the manager device 304 based on the data received from the analyst devices 104, 204. For example, if an analyst selects "yes" in the recommendation field 380, 480, the security may be added to the list of investment recommendations as a part of the GUI 510 provided to the manager device 304.

When the manager selects a specific security, as is represented by the dashed box 512 in FIG. 5, the GUI 510 of the manager application 332 may display the integrated data synopsis 520 (e.g., the integrated data synopsis 520 received at process 318). The integrated data synopsis combines data from several analyst devices (e.g., first investment team analyst devices 104 and second investment team analyst devices 204) to provide a single, integrated investment analysis synopsis. The integrated data synopsis may include an integrated analyst rating score, multiple integrated analyst sub-rating scores (e.g., an integrated risk sub-rating score, an integrated profitability sub-rating score, etc.), individual analyst tracking information scores, individual analyst feedback rating scores, individual rating scores, and individual sub-rating scores. For example, the integrated rating score and the integrated risk score may be determined by the provider institution computing system 106 based on the data received at process 302, process 305, process 306, and/or process 308. As discussed above, the integrated analyst rating score and one or more integrated analyst sub-rating scores may be determined by averaging the ratings received from each individual analyst device (e.g., analyst devices 104, 204). Alternatively, the integrated rating score and the integrated risk score may be determined using weighted averages based on the analyst data received. For example, if the security is in the financial sector, analyst rating scores and sub-rating scores from the fundamental investment team may be more heavily weighted than the analyst rating scores and sub-rating scores from the quantitative investment team.

In certain embodiments, the integrated data synopsis may also indicate which analyst and/or which investment teams recommend the selected or particular security(ies). Additionally, the integrated data synopsis may provide the average analyst rating scores and sub-rating scores from various investment teams. In certain embodiments, the manager may select the various field to view more details (e.g., which analyst submitted ratings, the maximum and minimum rating, when the ratings were submitted, etc.) about the information listed in the integrated data synopsis. Further, the GUI of the manager application 332 may include a "view additional notes" field that, when selected, may cause the GUI to display any additional notes submitted by the analyst devices 104, 204.

It should be understood that no claim element herein is to be construed under the provisions of 35 U.S.C. § 112(f), unless the element is expressly recited using the phrase "means for."

As used herein, the term "circuit" may include hardware configured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components configured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include physical currencies, non-physical currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method processes, it is understood that the order of these processes may differ from what is depicted. For example, two or more processes may be performed concurrently or with partial concurrence. Also, some method processes that are performed as discrete processes may be combined, processes being performed as a combined process may be separated into discrete processes, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching processes, correlation processes, comparison processes and decision processes.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system comprising:
a network interface circuit configured to facilitate data transmission over a network; and
a processing circuit comprising one or more processors coupled to non-transitory memory, wherein the processing circuit is configured to:
  detect a trigger event and in response, initiate tracking analyst interactions on a first analyst device such that the processing circuit is configured to receive analyst tracking information from the first analyst device only in response to the trigger event being detected;
  receive first analyst tracking information from the first analyst device relating to a security, wherein the first analyst tracking information includes a first set of analyst interactions;
  quantify the first set of analyst interactions;
  receive first analyst feedback from the first analyst device, wherein the first analyst feedback includes a first set of analyst sub-rating scores;
  receive second analyst tracking information from a second analyst device relating to the security, wherein the second analyst tracking information includes a second set of analyst interactions; receive second analyst feedback from the second analyst device, wherein the second analyst feedback includes a second set of analyst sub-rating scores;
  quantify the second set of analyst interactions; generate an integrated data synopsis including an integrated analyst rating score for the security, wherein the integrated analyst rating score is based on the quantified first set of analyst interactions, the quantified second set of analyst interactions, the first set of analyst sub-rating scores, the second set of analyst sub-rating scores; and
  provide a graphical user interface to a manager computing device depicting the integrated data synopsis.

2. The system of claim 1, wherein quantifying the first set of analyst interactions includes assigning each interaction an interaction score based on a characteristic of the interaction.

3. The system of claim 2, wherein quantifying the first set of analyst interactions further includes adjusting the interaction score by a pre-determined weighting factor that is based on specific characteristics of the security.

4. The system of claim 1, wherein the processing circuit is configured to generate and provide an alert to the manager computing device in response to determining a discrepancy between the first set of analyst sub-rating scores and the second set of analyst sub-rating scores.

5. The system of claim 1, wherein the graphical user interface further includes the first set of analyst sub-rating scores and the second set of analyst sub-rating scores.

6. The system of claim 5, wherein the integrated analyst rating score 1S generated in part by taking a weighted average of the first set of analyst sub-rating scores and the second set of analyst sub-rating scores, wherein a weight factor given to each sub-rating score in the first set of analyst sub-rating scores and each sub-rating score in the second set of analyst sub-rating scores are determined based on an industry categorization.

7. The system of claim 1, wherein the processing circuit is further configured to:
receive third analyst tracking information from a third analyst device configured to access resources related to the security, wherein the third analyst tracking information includes a third set of analyst interactions;
quantify the third set of analyst interactions; and
receive third analyst feedback from the third analyst device, wherein the third analyst feedback includes a third set of analyst sub-rating scores, wherein the integrated analyst rating score is determined based further on the quantified third set of analyst interactions, and the third set of analyst sub-rating scores.

8. A system comprising:
a provider institution computing system managed by an provider institution, the provider institution computing system comprising a provider institution network interface circuit configured to facilitate data transmission over a network and a provider institution processing circuit comprising one or more processors coupled to non-transitory memory, wherein the provider institution processing circuit is configured to:
  provide at least one of an analyst application or a virtual machine to a plurality of analyst devices, the plurality of analyst devices including a first analyst device and a second analyst device, wherein the at least one of the analyst application or the virtual machine are configured to track analyst interactions with each analyst device;
  track a plurality of analyst interactions on the plurality of analyst devices, wherein the analyst interactions include at least one of a phone call and an electronic communication related to a security;
  quantify the analyst interactions based on a characteristic of the analyst interactions including at least one of a duration of the analyst interactions, an identity of one or more parties involved in the analyst interactions, and a substance of the analyst interactions;
  receive analyst feedback from the plurality of analyst devices, wherein the analyst feedback includes a plurality of analyst sub-rating scores of the security;

generate an integrated data synopsis including an integrated analyst rating score for the security, wherein the integrated analyst rating score is determined based on the quantified analyst interactions, the plurality of analyst sub-rating scores; and provide a graphical user interface to a manager device including the integrated data synopsis;

wherein the at least one of the analyst application or the virtual machine is configured to detect a trigger event and in response, initiate tracking the analyst interactions on the plurality of analyst devices such that the provider institution processing circuit is configured to receive analyst tracking information only in response to the trigger event being detected.

9. The system of claim 8, wherein the quantified interactions are adjusted using weight factors that are determined at least in part by the characteristic of the security.

10. The system of claim 9, wherein the integrated analyst rating score is generated in part by taking a weighted average of the plurality of analyst sub-rating scores, wherein a weight is given to each analyst sub-rating score is determined based on an industry categorization.

11. The system of claim 8, wherein the provider institution processing circuit is configured to generate and provide an alert to the manager device in response to determining a discrepancy between sub-rating scores received from different analyst devices.

12. The system of claim 8, wherein the graphical user interface further includes a first set of analyst sub-rating scores from the first analyst device and a second set of analyst sub-rating scores from the second analyst device.

13. The system of claim 12, wherein the first set of analyst sub-rating scores and the second set of analyst sub-rating scores are anonymized.

14. A method of generating an integrated data synopsis comprising:

detecting a trigger event and in response, initiating tracking analyst interactions on a first analyst device such that analyst tracking information is received from the first analyst device only in response to the trigger event being detected;

receiving first analyst tracking information from the first analyst device configured to access resources related to a security, wherein the first analyst tracking information includes a first set of analyst interactions;

quantifying the first set of analyst interactions based in part on a type of interaction of the first set of analyst interactions;

receiving first analyst feedback from the first analyst device, wherein the first analyst feedback includes a first set of analyst sub-rating scores;

receiving second analyst tracking information from a second analyst device configured to access resources related to the security, wherein the second analyst tracking information includes a second set of analyst interactions;

receiving second analyst feedback from the second analyst device, wherein the second analyst feedback includes a second set of analyst sub-rating scores;

quantifying the second set of analyst interactions based in part on a type of interaction of the second set of analyst interactions;

generating the integrated data synopsis including an integrated analyst rating score for the security, wherein the integrated analyst rating score is determined based on the quantified first set of analyst interactions, the quantified second set of analyst interactions, the first set of analyst sub-rating scores, the second set of analyst sub-rating scores; and providing a graphical user interface to a manager computing device including the integrated data synopsis.

15. The method of claim 14, wherein quantifying the first set of analyst interactions includes assigning each interaction an interaction score based on a characteristic of the interaction.

16. The method of claim 15, wherein quantifying the first set of analyst interactions further includes adjusting the interaction score by a pre-determined weighting factor that is based on specific characteristics of the security.

17. The method of claim 14, further comprising generating and providing an alert to the manager computing device in response to determining a significant discrepancy between the first set of analyst sub-rating scores and the second set of analyst sub-rating scores.

18. The method of claim 14, wherein the graphical user interface further includes the first set of analyst sub-rating scores and the second set of analyst sub-rating scores.

* * * * *